United States Patent
Kuboi et al.

(10) Patent No.: US 8,783,969 B2
(45) Date of Patent: Jul. 22, 2014

(54) ILLUMINATION DEVICE AND METHOD OF IMPLEMENTING ILLUMINATION DEVICE

(75) Inventors: Toru Kuboi, Machida (JP); Satoshi Ohara, Hachioji (JP)

(73) Assignee: Olympus Corporation, Tokyo (JP)

( * ) Notice: Subject to any disclaimer, the term of this patent is extended or adjusted under 35 U.S.C. 154(b) by 395 days.

(21) Appl. No.: 13/186,781

(22) Filed: Jul. 20, 2011

(65) Prior Publication Data
US 2012/0018082 A1 Jan. 26, 2012

(30) Foreign Application Priority Data
Jul. 26, 2010 (JP) ................................. 2010-167404

(51) Int. Cl.
G02B 6/36 (2006.01)
G02B 6/00 (2006.01)

(52) U.S. Cl.
USPC .................. 385/80; 385/76; 385/77; 385/141

(58) Field of Classification Search
USPC ............................................... 385/73, 76–85
See application file for complete search history.

(56) References Cited

U.S. PATENT DOCUMENTS

| | | | | |
|---|---|---|---|---|
| 5,841,922 A * | 11/1998 | Iwatsuka et al. | ................. | 385/76 |
| 6,059,462 A * | 5/2000 | Finak et al. | ..................... | 385/73 |
| 6,404,954 B1 * | 6/2002 | Zhu et al. | ........................ | 385/34 |
| 6,535,668 B2 * | 3/2003 | Liu et al. | .......................... | 385/33 |
| 7,600,924 B2 * | 10/2009 | Hama et al. | ...................... | 385/73 |
| 7,751,661 B2 * | 7/2010 | Kadomi et al. | ................. | 385/36 |
| 7,878,696 B2 * | 2/2011 | Hama et al. | ..................... | 362/555 |
| 2007/0195538 A1 * | 8/2007 | Hama et al. | ................... | 362/382 |
| 2008/0075406 A1 * | 3/2008 | Kadomi et al. | ................ | 385/79 |
| 2011/0243510 A1 * | 10/2011 | Ohara | ............................. | 385/88 |
| 2011/0293220 A1 * | 12/2011 | Tanaka | ............................ | 385/39 |
| 2012/0018082 A1 * | 1/2012 | Kuboi et al. | .................. | 156/166 |

FOREIGN PATENT DOCUMENTS

JP 2001-350064 12/2001

* cited by examiner

*Primary Examiner* — Rhonda Peace
(74) *Attorney, Agent, or Firm* — Scully, Scott, Murphy & Presser, P.C.

(57) ABSTRACT

An illumination device includes an optical fiber holder configured to hold an optical fiber, a phosphor holder configured to hold a phosphor and faces the optical fiber holder, and a bonding material configured to intervene between the optical fiber holder and the phosphor holder to bond them. The illumination device includes adjustment guide members configured to intervene between the optical fiber holder and the phosphor holder, relatively positionally adjust the optical fiber holder and the phosphor holder so as to arrange an optical axis of the optical fiber and an optical axis of the phosphor on one line, and configured to prevent the optical fiber holder and the phosphor holder from tilting when the bonding material is cured.

11 Claims, 4 Drawing Sheets

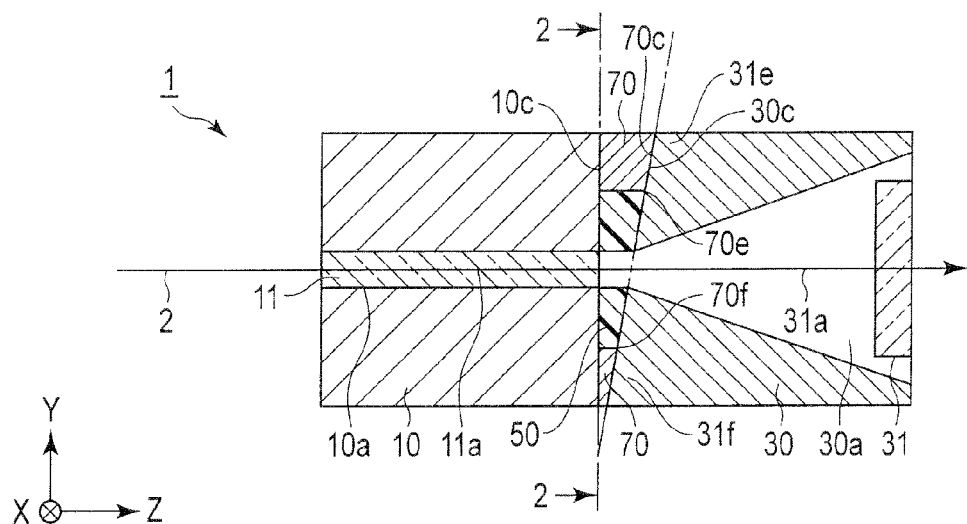
F I G. 1
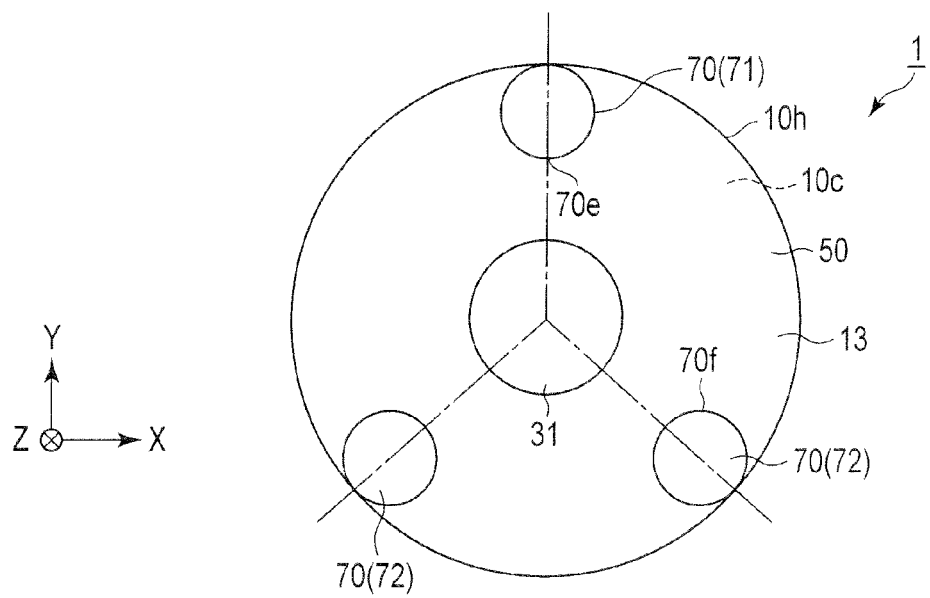
F I G. 2

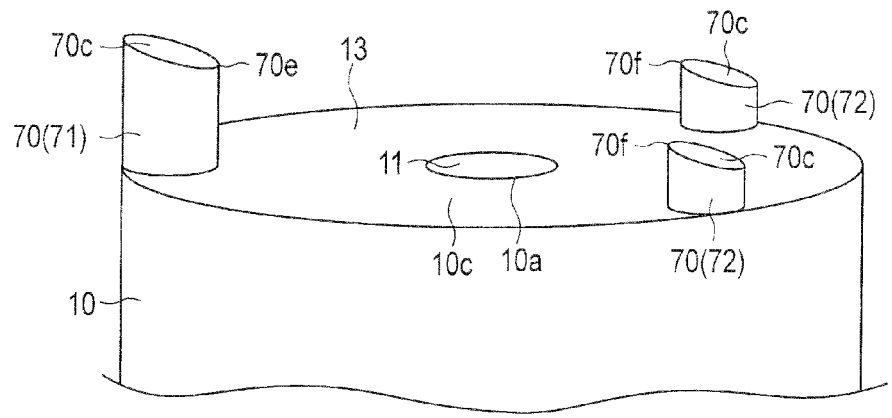
F I G. 3
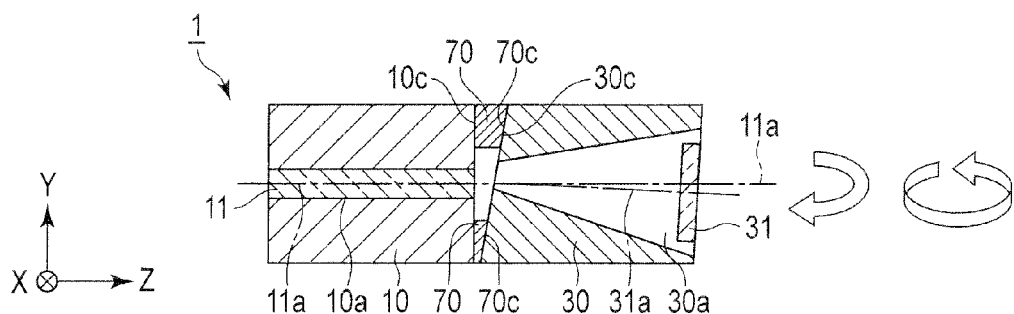
F I G. 4A
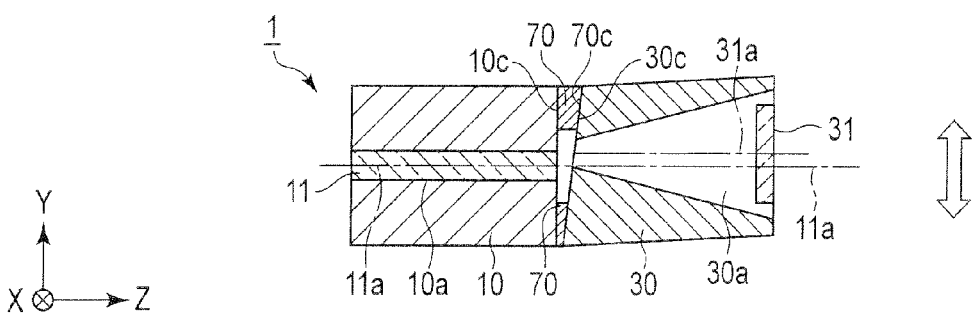
F I G. 4B

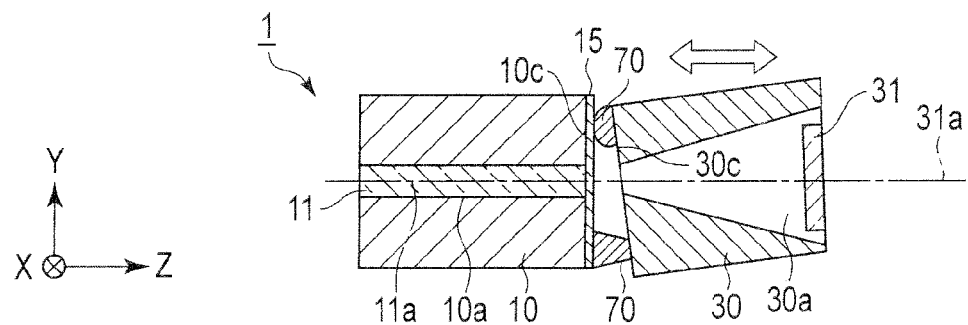
F I G. 5C
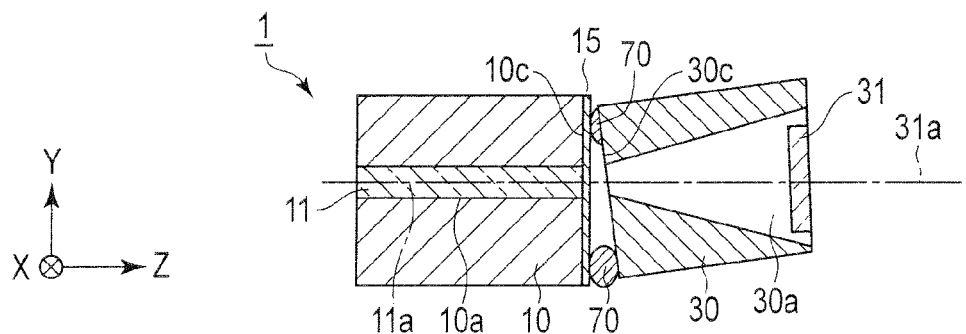
F I G. 5D

ILLUMINATION DEVICE AND METHOD OF IMPLEMENTING ILLUMINATION DEVICE

CROSS-REFERENCE TO RELATED APPLICATIONS

This application is based upon and claims the benefit of priority from prior Japanese Patent Application No. 2010-167404, filed Jul. 26, 2010, the entire contents of which are incorporated herein by reference.

BACKGROUND OF THE INVENTION

1. Field of the Invention

The present invention relates to an illumination device and a method of implementing an illumination device in which one holder and the other holder, each holding an optical element, are bonded after their positions are relatively adjusted while measuring the amount of light so as to minimize the amount of light loss which occurs upon optically coupling the optical elements to each other.

2. Description of the Related Art

The technique of relatively aligning a pair of optical elements including an optical fiber and a phosphor while making their optical axes match each other is generally called "active alignment". In this active alignment, the amount of light transmitting through the optical elements is measured. The optical elements are optically coupled after their positions are relatively adjusted so as to minimize the amount of light loss, that is, temporarily make the optical axes of the optical elements match each other.

An optical element module assembled using the active alignment is disclosed in, for example, Jpn. Pat. Appln. KOKAI Publication No. 2001-350064.

In Jpn. Pat. Appln. KOKAI Publication No. 2001-350064, a holder that holds an optical fiber (optical element) and a holder that holds an optical element such as a photodiode (PD) are aligned. An adhesive intervenes between the holders and is cured under UV irradiation light, thereby assembling an optical element module.

Active alignment is used when assembling the optical element module. That is, the amount of light is measured, and the positions of the holder including the optical fiber and that including the PD are adjusted in accordance with the measurement result. After that, the adhesive is cured under UV irradiation light to bond the holders. The optical elements are thus optically coupled to assemble the optical element module.

In the active alignment of the optical element module disclosed in Jpn. Pat. Appln. KOKAI Publication No. 2001-350064 described above, the optical fiber side and the PD side are relatively aligned based on the measurement result. However, the detailed alignment method is not disclosed.

The optical coupling state is affected by external factors such as the angle and finishing accuracy of a V-groove in the PD holder, the angularity and finishing accuracy of the bonding surface of the PD holder, the angle and finishing accuracy of a V-groove in the optical fiber holder, and the thickness of the adhesive. For this reason, the optical coupling state may shift due to these external factors. That is, the optical axis of the optical fiber and that of the PD may be misaligned. If the optical coupling is not ensured as desired, it is difficult to minimize the amount of light loss upon optical coupling.

In addition, if the thickness of the adhesive is uneven, or the whole adhesive is not uniformly irradiated with the UV irradiation light, the holders to be bonded may shift when the adhesive is cured. Even if the optical fiber and the PD are sufficiently optically coupled, the shift of the holders to be bonded may make it impossible to maintain the desired optical coupling state.

BRIEF SUMMARY OF THE INVENTION

The present invention has been made in consideration of the above-described situations, and has as its object to provide an illumination device and a method of implementing an illumination device which maintain an optical coupling state capable of easily minimizing the amount of light loss upon optical coupling.

According to an aspect of embodiments, an illumination device in which after an optical fiber holder holding an optical fiber and a phosphor holder holding a phosphor are relatively positionally adjusted, a bonding material intervening between the optical fiber holder and the phosphor holder is cured to bond the optical fiber holder and the phosphor holder, includes adjustment guide members configured to intervene between the optical fiber holder and the phosphor holder, relatively positionally adjust the optical fiber holder and the phosphor holder so as to arrange an optical axis of the optical fiber and an optical axis of the phosphor on one line, and configured to prevent the optical fiber holder and the phosphor holder from tilting when the bonding material is cured.

According to an aspect of embodiments, a method of implementing an illumination device in which after an optical fiber holder holding an optical fiber and a phosphor holder holding a phosphor are relatively positionally adjusted, a bonding material intervening between the optical fiber holder and the phosphor holder is cured to bond the optical fiber holder and the phosphor holder, includes fixing a position of one of the optical fiber holder and the phosphor holder before relatively positionally adjusting the optical fiber holder and the phosphor holder, moving the other of the optical fiber holder and the phosphor holder toward the one so as to abut an end face of the other, which tilts with respect to an optical axis direction on the other side, against distal end faces of adjustment guide members, which tilt with respect to an optical axis direction on the other side, the adjustment guide members being disposed on the end face of the one and having heights based on the end face of the one in an optical axis direction on the one side, adjusting a position of the other relative to a position of the one by tilting the other with respect to the one about the optical axis direction on the one side so that the end face of the other tilts with respect to the distal end faces about the optical axis on the one side, thereby making an optical axis of the optical fiber parallel to an optical axis of the phosphor, adjusting the position of the other relative to the position of the one by moving the other with respect to the one in an X-axis direction perpendicular to the optical axis direction on the one side and a Y-axis direction perpendicular to the optical axis direction on the one side and the X-axis direction so that the end face of the other slides with respect to the distal end faces about the optical axis on the one side in the X-axis direction and the Y-axis direction while keeping abutting against the distal end faces, thereby arranging the optical axis of the phosphor and the optical axis of the optical fiber on one line and bonding the optical fiber holder and the phosphor holder by curing the bonding material while causing the adjustment guide members to prevent the optical fiber holder and the phosphor holder from tilting.

According to an aspect of embodiments, a method of implementing an illumination device in which after an optical fiber holder holding an optical fiber and a phosphor holder holding a phosphor are relatively positionally adjusted, a bonding material intervening between the optical fiber holder and the phosphor holder is cured to bond the optical fiber holder and the phosphor holder, includes fixing a position of one of the optical fiber holder and the phosphor holder before relatively positionally adjusting the optical fiber holder and the phosphor holder, moving the other of the optical fiber holder and the phosphor holder toward the one so as to abut an end face of the other against adjustment guide members, the adjustment guide members being disposed on the end face of the one and being plastic-deformable when being pressed, tilting the other with respect to the one about an optical axis on the one side while causing the end face of the other to press and plastic-deform the adjustment guide members, thereby making an optical axis of the optical fiber parallel to an optical axis of the phosphor, adjusting a position of the other relative to a position of the one by sliding the other with respect to the adjustment guide members about the optical axis on the one side in an X-axis direction perpendicular to the optical axis direction on the one side and a Y-axis direction perpendicular to the optical axis direction on the one side and the X-axis direction while keeping the end face of the other abutting against the adjustment guide members, thereby arranging the optical axis of the phosphor and the optical axis of the optical fiber on one line, adjusting the position of the other relative to the position of the one by moving the other against the one in the optical axis direction on the one side so that the end face of the other presses the adjustment guide members about the optical axis of the optical fiber in the optical axis direction on the one side and plastic-deforms the adjustment guide members and bonding the optical fiber holder and the phosphor holder by curing the bonding material while causing the adjustment guide members to prevent the optical fiber holder and the phosphor holder from tilting.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic sectional view of an illumination device according to the first embodiment of the present invention;

FIG. 2 is a side view taken along a line 2-2 in FIG. 1;

FIG. 3 is a perspective view of adjustment guide members;

FIG. 4A is a view showing a method of implementing an illumination device;

FIG. 4B is a view showing a method of implementing an illumination device;

FIG. 5C is a view showing a method of implementing an illumination device according to the second embodiment; and FIG. 5D is a view showing a method of implementing an illumination device according to the second embodiment.

DETAILED DESCRIPTION OF THE INVENTION

Figure 4C:
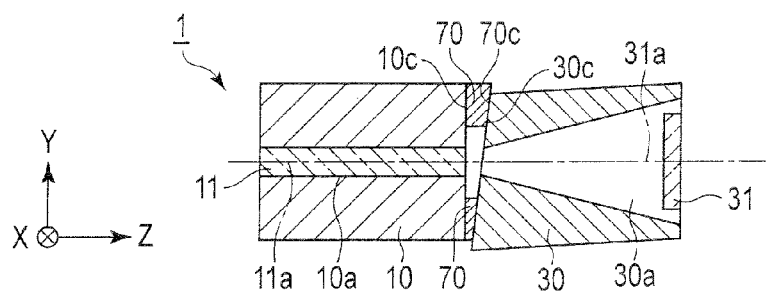
FIG. 4C is a view showing a method of implementing an illumination device.

The embodiments of the present invention will now be described in detail with reference to the accompanying drawing.

The first embodiment will be described with reference to FIGS. 1, 2, 3, 4A, 4B, and 4C.

Note that the direction of an optical axis 11a of an optical fiber 11 will be referred to as a Z-axis direction, the direction perpendicular to the Z-axis direction as an X-axis direction, and the direction perpendicular to the Z- and X-axis directions as a Y-axis direction hereinafter. Note that the Z-axis direction is the direction in which a laser beam 2 emits or transmits through the optical fiber 11 and a phosphor 31. Note that optical coupling indicates coupling of the optical fiber 11 and the phosphor 31 after the positions of an optical fiber holder 10 and a phosphor holder 30 are adjusted to make the optical axis 11a of the optical fiber 11 match an optical axis 31a of the phosphor 31.

An illumination device 1 includes the optical fiber holder 10 that holds the optical fiber 11 capable of transmitting the laser beam 2, the phosphor holder 30 that holds the phosphor 31 and faces the optical fiber holder 10, an adhesive 50 serving as a bonding material that intervenes between the optical fiber holder 10 and the phosphor holder 30 to bond them, and adjustment guide members 70 that intervene between the optical fiber holder 10 and the phosphor holder 30 to relatively adjust their positions so that the optical axis 11a of the optical fiber 11 and the optical axis 31a of the phosphor 31 are arranged on one line.

The optical fiber holder 10 is a ferrule made of, for example, ceramic or stainless steel. To hold the optical fiber 11, the optical fiber holder 10 has a hole 10a. The hole 10a penetrates the optical fiber holder 10 in the axial direction of the optical fiber holder 10. The diameter of the hole 10a is almost the same as that of the optical fiber 11. The optical fiber 11 fits in or is adhered to the hole 10a so that the optical fiber holder 10 holds the optical fiber 11. At this time, the optical fiber holder 10 holds the optical fiber 11 so that the emit end face of the optical fiber 11 becomes flush with an end face 10c of the optical fiber holder 10, The optical fiber holder 10 has the holes 10a as many as the optical fibers 11. One optical fiber 11 fits in or is adhered to one hole 10a. Note that in this embodiment, one hole 10a and one optical fiber 11 are illustrated for the sake of simplicity. The number of holes 10a and the number of optical fibers 11 are not particularly limited as far as they are equal in number. The end face 10c is formed to be, for example, flat.

When being irradiated with the laser beam 2 that has emitted from the optical fiber 11, the phosphor 31 excites light in the desired wavelength.

The phosphor holder 30 is made of, for example, ceramic or stainless steel. The phosphor holder 30 has a hollow portion 30a in, for example, a truncated conical shape that increases the diameter in the direction of emit (propagation) of the laser beam 2. The phosphor holder 30 has the phosphor 31 at a desired position in the hollow portion 30a, for example, at the position farthest from the optical fiber holder 10 (end face 10c). The hollow portion 30a is disposed centered on the optical axis 31a of the phosphor 31 so as to penetrate the phosphor holder 30. Nota that the hollow portion 30a includes an optical characteristic matching member (not shown) that matches the optical characteristic (for example, refractive index) in the hollow portion 30a. The phosphor 31 and the optical characteristic matching member function as a wavelength conversion member that converts the wavelength of the laser beam into a desired wavelength.

The optical fiber holder 10 and the phosphor holder 30 respectively have the end faces 10c and 30c facing each other. That is, the optical fiber holder 10 has the end face 10c facing the end face 30c of the phosphor holder 30. In addition, the phosphor holder 30 has the end face 30c facing the end face 10c of the optical fiber holder 10, One of the end faces 10c and 30c is a flat surface perpendicular to the Z-axis direction and parallel to the X- and Y-axis directions. The other is a flat surface that tilts at a desired angle with respect to the optical axis direction on the other side. In this embodiment, the description will be made assuming that the end face 10c is a flat surface, and the end face 30c is a tilted surface. Hence, the end face 30c on the other side tilts at a desired angle with respect to the direction of the optical axis 31a of the phosphor 31 on the other side.

The adhesive 50 is a UV-curable epoxy adhesive that is cured when irradiated with UV light. The adhesive 50 intervenes between the end face 10c and the end face 30c and is cured when irradiated with UV light after active alignment. The active alignment indicates that the optical fiber holder 10 and the phosphor holder 30 are adjusted to desired relative positions, and the optical fiber 11 is optically coupled with the phosphor 31. By being cured, the adhesive 50 adheres the end face 10c to the end face 30c and thus bonds the optical fiber holder 10 to the phosphor holder 30. Hence, the end faces 10c and 30c are adhesive surfaces (bonding surfaces). Note that the adhesive 50 intervenes between the end face 10c and the end face 30c but does not exist on portions of the end face 10c where the adjustment guide members 70 are disposed, on distal end faces 70c of the adjustment guide members 70, and on the end face 30c abutting against the distal end faces 70c of the adjustment guide members 70.

The adjustment guide members 70 need only be disposed on at least one of the end faces 10c and 30c as far as they intervene between the end face 10c and the end face 30c. In this embodiment, the adjustment guide members 70 are disposed on, for example, the end face 10c. The adjustment guide members 70 are disposed on the end face 10c on one side and abut against the end face 30c on the other side at the distal end faces 70c. In this case, the adjustment guide members 70 may be integrated with or separated from the optical fiber holder 10. When disposing the adjustment guide members 70 on the end face 10c as separated bodies, for example, holes (not shown) are formed in the end face 10c so as to fit on the adjustment guide members 70. The adjustment guide members 70 are made of, for example, ceramic or stainless steel.

As shown in FIGS. 2 and 3, a plurality of adjustment guide members 70 are disposed, each of which has, for example, an almost cylindrical shape. Each adjustment guide member 70 has the flat distal end face 70c facing and abutting against the end face 30c. The distal end face 70c is a tilted surface that tilts at a desired angle with respect to the Z-axis direction, like the end face 30c. The tilt angle of the distal end face 70c and that of the end face 30c may be almost the same or different. The distal end faces 70c of the adjustment guide members 70 have the same tilt angle. The distal end faces 70c tilt at a desired angle with respect to the direction of the optical axis 31a of the phosphor 31 on the other side (the side facing the distal end faces 70c) of the end faces 10c and 30c.

The adjustment guide members 70 have desired heights in the Z-axis direction based on the end face 10c on which they are disposed. The adjustment guide members 70 have different heights.

More specifically, since the end face 30c tilts, the end face 30c becomes higher from the side of one end portion 31e to the side of the other end portion 31f, as shown in FIG. 1, For this reason, the adjustment guide members 70 also decrease their heights from an adjustment guide member 71 facing the side of the one end portion 31e to adjustment guide members 72 facing the side of the other end portion 31f, as shown in FIGS. 1 and 3. A lowest portion 70e of the distal end face 70c of the adjustment guide member 71 facing the side of the one end portion 31e is at least higher than a highest portion 70f of the distal end face 70c of the adjustment guide member 72 facing the side of the other end portion 31f. That is, the adjustment guide members 70 gradually decrease the heights from the side of the one end portion 31e to the side of the other end portion 31f.

As shown in FIG. 2, the adjustment guide members 70 are preferably disposed on the side of an outer edge 10h of the end face 10c. The adjustment guide members 70 are spaced part from each other at an almost equal interval (for example, at an angle of 120°) along the circumferential direction. For this reason, a gap portion 13 is formed among the adjustment guide members 70 on the end face 10c in its peripheral direction, as shown in FIG. 2. Note that the gap portion 13 is also formed between the optical fiber holder 10 and the phosphor holder 30 not two-dimensionally but three-dimensionally depending on the height of the adjustment guide member 70, as shown in FIG. 3. The gap portion 13 is filled with the adhesive 50.

The distal end faces 70c on which the end face 30c slide serve as sliding surfaces.

Note that in general, if the application amount of the adhesive 50 varies, or the UV light irradiation is uneven, the adhesive 50 may not be cured uniformly under UV light. In such a case, even if the optical fiber 11 and the phosphor 31 are sufficiently optically coupled in the assembly step, the optical fiber holder 10 and the phosphor holder 30 to be bonded may shift in the next step (bonding step). This may generate a moment to tilt the optical fiber holder 10 and the phosphor holder 30. The adjustment guide members 70 of this embodiment receive this moment to prevent the optical fiber holder 10 and the phosphor holder 30 from tilting when the adhesive 50 is cured.

A method of implementing the illumination device 1 including active alignment of this embodiment will be described next with reference to FIGS. 4A, 4B, and 4C. The active alignment of this embodiment indicates relative positional adjustment between the optical fiber holder 10 and the phosphor holder 30 and optical coupling of the optical fiber 11 and the phosphor 31. Note that for easier recognition of optical coupling, FIGS. 4A, 4B, and 4C do not illustrate the adhesive 50.

The optical fiber holder 10 and the phosphor holder 30 are respectively held by assembly devices (not shown) and positionally adjusted to make the end faces 10c and 30c face each other (Step 1).

At this time, as shown in FIG. 4A, the optical axis 11a of the optical fiber 11 and the optical axis 31a of the phosphor 31 are not parallel and do not match due to the influence of parts finishing and assembly accuracy. That is, the optical axis 11a of the optical fiber 11 and the optical axis 31a of the phosphor 31 are not arranged on one line.

The laser beam 2 is emitted by a light source (not shown) and transmits through the optical fiber 11. The laser beam 2 that has transmitted through the optical fiber 11 enters the phosphor holder 30 and irradiates the phosphor 31. When being irradiated with the laser beam 2, the phosphor 31 excites light in the desired wavelength (Step 2).

The amount of light of the laser beam 2 in the phosphor 31 is measured by a measuring unit (not shown.) (Step 3).

Note that emission of the laser beam 2 and measurement of the amount of light always continue during the following operation.

The assembly device fixes the position of one of the optical fiber holder 10 and the phosphor holder 30. Assume below that the optical fiber holder 10 is fixed (Step 4, fixing step).

As shown in FIG. 4A, the assembly device moves the phosphor holder 30 toward the optical fiber holder 10 so as to make the end face 30c abut against the distal end faces 70c (Step 5, abutting step).

At this time, the optical axis 31a of the phosphor 31 needs to be parallel to the optical axis 11a of the optical fiber 11 so that the amount of light measured is maximized, as described above.

To do this, as shown in FIG. 4A, the other of the optical fiber holder 10 and the phosphor holder 30, that is, the phosphor holder 30 (end face 30c) is tilted by the assembly device with respect to the optical fiber holder 10 such that the end face 30c abutting against the distal end faces 70c serving as sliding surfaces tilts with respect to the distal end faces 70c about the optical axis 11a of the optical fiber 11 along the Z-axis, that is, slides about the X- and Y-axes. The optical axis 31a of the phosphor 31 thus tilts to be parallel to the optical axis 11a of the optical fiber 11, as shown in FIG. 4B, and the amount of light is maximized.

In this way, the other of the optical fiber holder 10 and the phosphor holder 30, that is, the phosphor holder 30 (end face 30c) tilts about the Z-axis with respect to the distal end faces 70c such that the amount of light measured by the measuring unit is maximized, and the optical axis 31a of the phosphor 31 becomes parallel to the optical axis 11a of the optical fiber 11, thereby adjusting the position with respect to the optical fiber holder 10 (Step 6, first positional adjustment step).

As described above, when the amount of light is maximized, and the optical axis 31a of the phosphor 31 becomes parallel to the optical axis 11a of the optical fiber 11, the positional adjustment of the phosphor holder 30 (end face 30c) with respect to the optical fiber holder 10, in other words, parallel adjustment between the optical axis 31a of the phosphor 31 and the optical axis 11a of the optical fiber 11 ends.

Next, it is necessary to make the optical axis 31a of the phosphor 31 match the optical axis 11a of the optical fiber 11, that is, arrange the optical axes on one line, as shown in FIG. 4C, so as to further maximize the measured amount of light, as described above.

For this purpose, as shown in FIG, 4B, the phosphor holder 30 (end face 30c) is moved by the assembly device in the X- and Y-axis directions with respect to the optical fiber holder 10 and aligned such that the end face 30c abutting against the distal end faces 70c serving as the sliding surfaces slides with respect to them in the X- and Y-axis directions about the optical axis 11a of the optical fiber 11. The optical axis 31a of the phosphor 31 thus matches the optical axis 11a of the optical fiber 11, as shown in FIG. 4C, that is, the optical axes are arranged on one line, and the amount of light is further maximized.

In this way, the other of the optical fiber holder 10 and the phosphor holder 30, that is, the phosphor holder 30 (end face 30c) moves in the X- and Y-axis directions with respect to the distal end faces 70c such that the amount of light measured by the measuring unit is further maximized, and the optical axis 31a of the phosphor 31 and the optical axis 11a of the optical fiber 11 are arranged on one line, thereby adjusting the position with respect to the optical fiber holder 10 in the X- and Y-axis directions (Step 7, second positional adjustment step).

As described above, when the amount of light is further maximized, and the optical axis 31a of the phosphor 31 and the optical axis 11a of the optical fiber 11 are arranged on one line, the positional adjustment of the phosphor holder 30 (end face 30c) in the X- and Y-axis directions with respect to the optical fiber holder 10 ends.

Next, UV light emitted by a UV irradiation device (not shown) irradiates the adhesive 50 from (the gap portion 13) between the adjustment guide members 70 in the circumferential direction for a desired time. The adhesive 50 is cured to bond the optical fiber holder 10 and the phosphor holder 30 (Step 8, bonding step).

Note that the adhesive 50 fills the gap portion 13 at a desired timing.

Note that in Step 8 (bonding step), when the adhesive 50 is cured, the adjustment guide members 70 receive the moment to prevent the optical fiber holder 10 and the phosphor holder 30 from tilting upon curing of the adhesive 50.

In the above-described way, the relative positions between the optical fiber holder 10 and the phosphor holder 30 are adjusted, and the optical axis 11a of the optical fiber 11 and the optical axis 31a of the phosphor 31 are arranged on one line. In this state, the optical fiber holder 10 and the phosphor holder 30 are bonded by the adhesive 50. The optical fiber 11 and the phosphor 31 are optically coupled, and the active alignment ends. The illumination device 1 is thus implemented.

Note that when the adhesive 50 is cured and bonds the optical fiber holder 10 and phosphor holder 30, the adjustment guide members 70 prevents the optical fiber holder 10 and the phosphor holder 30 from tilting in Step 8. Hence, the optical fiber holder 10 and the phosphor holder 30 are bonded while maintaining the active alignment in Step 7.

The illumination device 1 is taken out of the assembly devices, and the assembly is completed (Step 9).

As described above, in this embodiment, the phosphor holder 30 is tilted about the Z-axis with respect to the optical fiber holder 10 so as to tilt the end face 30c about the Z-axis with respect to the distal end faces 70c. This allows to adjust the tilt of the optical axis 11a of the optical fiber 11 and the optical axis 31a of the phosphor 31 such that they become parallel. In this embodiment, the phosphor holder 30 is moved in the X- and Y-axis directions with respect to the optical fiber holder 10 so as to slide the end face 30c in the X- and Y-axis directions with respect to the distal end faces 70c. This allows to make the optical axis 11a of the optical fiber 11 match the optical axis 31a of the phosphor 31. In this embodiment, this makes it possible to easily minimize the amount of light loss upon optical coupling.

In this embodiment, the adjustment guide members 70 receive the moment. This allows to prevent the optical fiber holder and the phosphor holder 30 from tilting upon curing of the adhesive 50 even when the application amount of the adhesive 50 varies, the UV light irradiation is uneven, or the optical fiber 11 and the phosphor 31 are sufficiently optically coupled in the assembly step, but the optical fiber holder 10 and the phosphor holder 30 to be bonded shift in the next step (bonding step). In this embodiment, this makes it possible to maintain the active alignment and maintain the desired optical coupling state (capable of easily minimizing the amount of light loss upon optical coupling) without being affected by curing of the adhesive 50.

In this embodiment, it is possible to easily minimize the amount of light loss upon optical coupling and maintain the desired optical coupling state without being affected by curing of the adhesive 50. Hence, the illumination device 1 capable of reducing the amount of light loss of the laser beam 2 can be provided.

In this embodiment, forming the gap portion 13 facilitates filling of the adhesive 50 and irradiation of UV light.

In this embodiment, filling the gap portion 13 with the adhesive 50 facilitates irradiating the adhesive 50 with UV light.

In this embodiment, the end face 30c and the distal end faces 70c tilt with respect to the optical axis 31a. This allows to tilt the end face 30c about the Z-axis with respect to the distal end faces 70c and further tilt the end face 30c about the Z-axis with respect to the distal end faces 70c. In this embodiment, it is consequently possible to easily minimize the amount of light loss upon optical coupling, as described above.

In this embodiment, the adjustment guide members 70 are disposed on the side of the outer edge 10h of the end face 10c while being spaced part from each other at an equal interval along the circumferential direction. This facilitates filling of the adhesive 50 and irradiation of UV light, and enables to ensure a larger sliding surface.

In this embodiment, sliding the end face 30c on the distal end faces 70c of the adjustment guide members 70 makes it possible to precisely adjust the relative positions between the optical fiber holder 10 and the phosphor holder 30 about the X- and Y-axes and in the X- and Y-axis directions. In this embodiment, sliding the end face 30c on the distal end faces 70c of the adjustment guide members 70 allows to easily adjust the relative positions between the optical fiber holder 10 and the phosphor holder 30. In this embodiment, sliding the end face 30c on the distal end faces 70c of the adjustment guide members 70 enables to precisely adjust the relative positions between the optical fiber holder 10 and the phosphor holder 30 without being affected by external factors such as the thickness of the adhesive 50 and the finishing accuracy of the optical fiber holder 10 and the phosphor holder 30.

In this embodiment, the number of adjustment guide members 70 is not particularly limited if they can be disposed at an equal interval along the circumferential direction.

In this embodiment, the distal end faces 70c are tilted surfaces. However, the present invention is not limited to this. The end face 30c or the end face facing the end face 30c may be tilted.

In this embodiment, the end face 30c slides on the distal end faces 70c. However, the present invention is not limited to this. The distal end faces 70c may slide on the end face 30c.

The second embodiment of the present invention will be described next with reference to FIGS. 5A, 5B, 5C, and 5D. Note that the same reference numerals as in the first embodiment denote the same parts, and a description thereof will not be repeated.

Both an end face 10c and an end face 30c according to this embodiment are flat.

Adjustment guide members 70 according to this embodiment are formed from plastic-deformable members for example, Au bumps. An underlying film 15 is disposed on, for example, the end face 10c on which the adjustment guide members 70 of this embodiment are disposed. The adjustment guide members 70 are preferably disposed on the underlying film 15 on the side of an outer edge 10h of the end face 10c, as in the first embodiment. The adjustment guide members 70 are spaced part from each other at an equal interval (for example, at an angle of 120°) along the circumferential direction.

A method of implementing an illumination device 1 including active alignment of this embodiment will be described next. Note that for easier recognition of optical coupling, an adhesive 50 is not illustrated. The operation of Step 1, the operation of Step 2, the operation of Step 3, and the operation of Step 4 are performed.

Figure 5A:
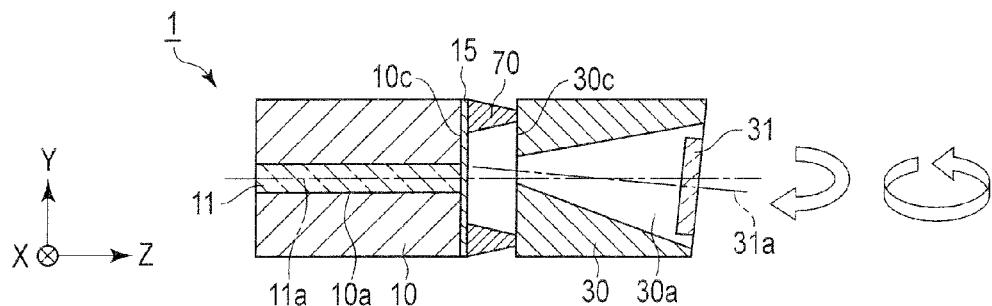
FIG. 5A is a view showing a method of implementing an illumination device according to the second embodiment.

As shown in FIG. 5A, the assembly device moves a phosphor holder 30 toward an optical fiber holder 10 such that the end face 30c presses the adjustment guide members 70 (Step 21, abutting step).

At this time, an optical axis 31a of a phosphor 31 needs to be parallel to an optical axis 11a of an optical fiber 11 so that the amount of light measured is maximized, as described above.

Figure 5B:
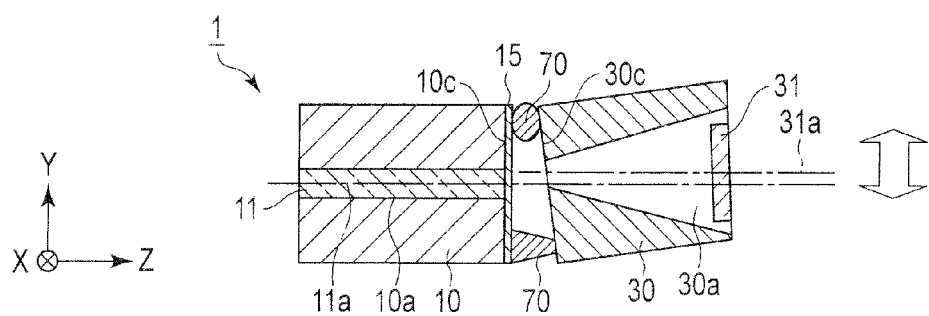
FIG. 5B is a view showing a method of implementing an illumination device according to the second embodiment.

To do this, as shown in FIG. 5A, the end face 30c is tilted with respect to the optical axis 11a so that the optical axis 31a becomes parallel to the optical axis 11a. At this time, the end face 30c needs to plastic-deform the adjustment guide members 70 serving as the sliding surfaces while pressing them about the optical axis 11a of the optical fiber 11. In this way, the other of the optical fiber holder 10 and the phosphor holder 30, that is, the phosphor holder 30 (end face 30c) is tilted by the assembly device about the optical axis 11a with respect to the optical fiber holder 10 while pressing and plastic-deforming the adjustment guide members 70. The optical axis 31a of the phosphor 31 thus becomes parallel to the optical axis 11a of the optical fiber 11, as shown in FIG. 5B, and the amount of light is maximized.

In this way, the other of the optical fiber holder 10 and the phosphor holder 30, that is, the phosphor holder 30 (end face 30c) presses and plastic-deforms the adjustment guide members 70 such that the amount of light measured by the measuring unit is maximized, and the optical axis 31a of the phosphor 31 becomes parallel to the optical axis 11a of the optical fiber 11, thereby adjusting the position with respect to the optical fiber holder 10 (Step 22, first positional adjustment step).

As described above, when the amount of light is maximized, and the optical axis 31a of the phosphor 31 becomes parallel to the optical axis 11a of the optical fiber 11, the positional adjustment of the phosphor holder 30 (end face 30c) with respect to the optical fiber holder 10 for the tilt ends.

Next, it is necessary to make the optical axis 31a of the phosphor 31 match the optical axis 11a of the optical fiber 11, that is, arrange the optical axes on one line, as shown in FIG. 5C, so as to further maximize the measured amount of light, as described above.

For this purpose, as shown in FIG. 5B, the end face 30c slides in the X- and Y-axis directions with respect to the adjustment guide members 70 functioning as a guide about the optical axis 11a of the optical fiber 11 while keeping abutting against the adjustment guide members 70. Hence, the other of the optical fiber holder 10 and the phosphor holder 30, that is, the phosphor holder 30 (end face 30c) is moved by the assembly device in the X- and Y-axis directions with respect to the optical fiber holder 10 while sliding in the X- and Y-axis directions with respect to the adjustment guide members 70. The optical axis 31a of the phosphor 31 thus matches the optical axis 11a of the optical fiber 11, as shown in FIG. 5C, that is, the optical axes are arranged on one line, and the amount of light is further maximized.

In this way, the other of the optical fiber holder 10 and the phosphor holder 30, that is, the phosphor holder 30 (end face 30c) slides in the X- and Y-axis directions with respect to the adjustment guide members 70 such that the amount of light measured by the measuring unit is further maximized, and the optical axis 31a of the phosphor 31 and the optical axis 11a of the optical fiber 11 are arranged on one line, thereby adjusting the position with respect to the optical fiber holder 10 in the X- and Y-axis directions (Step 23, second positional adjustment step).

As described above, when the amount of light is further maximized, and the optical axis 31a of the phosphor 31 and the optical axis 11a of the optical fiber 11 are arranged on one line, the positional adjustment of the phosphor holder 30 (end face 30c) in the X- and Y-axis directions with respect to the optical fiber holder 10 ends.

Note that in the above-described step, the end face 30c slides in the X- and Y-axis directions with respect to the adjustment guide members 70 to make the optical axes 31a and 11a match. However, the present invention is not limited to this. For example, the end face 30c may press and plastic-deform the adjustment guide members 70 in the X- and Y-axis directions to make the optical axes 31a and 11a match.

Next, it is necessary to cause the end face 30c to press the plastic-deformable adjustment guide members 70 in the Z-axis direction about the optical axis 11a of the optical fiber 11 and thus plastic-deform the adjustment guide members 70, as shown in FIG. 5D, so as to further maximize the measured amount of light, as described above. To do this, as shown in FIG. 5C, the other of the optical fiber holder 10 and the phosphor holder 30, that is, the phosphor holder 30 (end face 30c) is moved by the assembly device in the Z-axis direction with respect to the optical fiber holder 10 while pressing the adjustment guide members 70 in the Z-axis direction to plastic-deform them. The amount of light is thus maximized.

In this way, the other of the optical fiber holder 10 and the phosphor holder 30, that is, the phosphor holder 30 (end face 30c) presses the adjustment guide members 70 in the Z-axis direction to plastic-deform them such that the amount of light measured by the measuring unit is further maximized, thereby adjusting the position in the Z-axis direction (Step 24, third positional adjustment step).

As described above, when the amount of light is further maximized, the positional adjustment of the phosphor holder 30 (end face 30c) in the Z-axis direction with respect to the optical fiber holder 10 ends, as shown in FIG. 59.

After that, the operation of Step 8 and the operation of Step 9 are performed.

As described above, in this embodiment, the adjustment guide members 70 are formed from plastic-deformable members to enable to adjust the relative positions between the optical fiber holder 10 and the phosphor holder 30 in the Z-axis direction. In this embodiment, the positional adjustment of the optical fiber holder 10 and the phosphor holder 30 in the Z-axis direction is thus performed. For example, when the optical fiber 11 and the phosphor 31, for example, come nearer, it is possible to more easily minimize the amount of light loss upon optical coupling and ensure a larger amount of light.

In this embodiment, since it is possible to maintain the desired optical coupling state without being affected by curing of the adhesive 50, the illumination device 1 capable of further reducing the amount of light loss of a laser beam 2 can be provided.

The present invention is not limited to the above embodiments, and constituent elements can be modified in the stage of practice without departing from the spirit and scope of the invention. Various inventions can be formed by properly combining a plurality of constituent elements disclosed in the above embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination device in which after an optical fiber holder holding an optical fiber and a phosphor holder holding a phosphor are relatively positionally adjusted, a bonding material intervening between the optical fiber holder and the phosphor holder is cured to bond the optical fiber holder and the phosphor holder, comprising:
    adjustment guide members configured to intervene between the optical fiber holder and the phosphor holder, relatively positionally adjust the optical fiber holder and the phosphor holder so as to arrange an optical axis of the optical fiber and an optical axis of the phosphor on one line, and configured to prevent the optical fiber holder and the phosphor holder from tilting when the bonding material is cured,
    wherein the adjustment guide members have heights based on an end face of one of the optical fiber holder and the phosphor holder, on which the adjustment guide members are disposed, in an optical axis direction on the one side, and form a gap portion between the optical fiber holder and the phosphor holder by the heights, and
    wherein the gap portion is filled with the bonding material.

2. The device according to claim 1, wherein an end face of the other of the optical fiber holder and the phosphor holder and distal end faces of the adjustment guide members facing the end face of the other tilt at a desired angle with respect to an optical axis direction on the other side.

3. The device according to claim 2, wherein the adjustment guide members are disposed on a side of an outer edge of the end face of the one and spaced part from each other at a substantially equal interval along a circumferential direction.

4. The device according to claim 3, wherein the bonding material includes a UV-curable epoxy adhesive that is cured when irradiated with UV light.

5. The device according to claim 4, wherein the adjustment guide members are formed from plastic-deformable members.

6. The device according to claim 5, wherein the adjustment guide members include Au bumps and are disposed on an underlying film formed on the end face of the one.

7. The device according to claim 1, wherein an end face of one of the optical fiber holder and the phosphor holder and distal end faces of the adjustment guide members facing the end face of the one tilt at a desired angle with respect to an optical axis direction on the other side.

8. The device according to claim 7, wherein the adjustment guide members are disposed on a side of an outer edge of an end face of the other of the optical fiber holder and the phosphor holder and spaced part from each other at a substantially equal interval along a circumferential direction.

9. The device according to claim 1, wherein the bonding material includes a UV-curable epoxy adhesive that is cured when irradiated with UV light.

10. The device according to claim 9, wherein the adjustment guide members are formed from plastic-deformable members.

11. The device according to claim 10, wherein the adjustment guide members include Au bumps and are disposed on an underlying film formed on the end face of the one.

* * * * *